(12) United States Patent
Daniels

(10) Patent No.: US 10,082,229 B2
(45) Date of Patent: Sep. 25, 2018

(54) METER LOCK AND EXTENDER SYSTEM AND METHOD USE

(71) Applicant: Ron R. Daniels, Missouri City, TX (US)

(72) Inventor: Ron R. Daniels, Missouri City, TX (US)

(*) Notice: Subject to any disclaimer, the term of this patent is extended or adjusted under 35 U.S.C. 154(b) by 733 days.

(21) Appl. No.: 14/028,235

(22) Filed: Sep. 16, 2013

(65) Prior Publication Data

US 2014/0077490 A1   Mar. 20, 2014

Related U.S. Application Data

(60) Provisional application No. 61/702,409, filed on Sep. 18, 2012, provisional application No. 61/775,074, filed on Mar. 8, 2013.

(51) Int. Cl.

| F16L 35/00 | (2006.01) |
|---|---|
| F16L 19/00 | (2006.01) |
| E05B 65/00 | (2006.01) |
| F16K 35/06 | (2006.01) |
| G01F 15/14 | (2006.01) |
| G01F 15/00 | (2006.01) |
| G01F 15/18 | (2006.01) |

(52) U.S. Cl.
CPC ........ *F16L 19/005* (2013.01); *E05B 65/0089* (2013.01); *F16K 35/06* (2013.01); *G01F 15/007* (2013.01); *G01F 15/14* (2013.01); *G01F 15/18* (2013.01)

(58) Field of Classification Search
CPC ........ F16L 57/00; F16L 57/005; F16L 19/005
USPC .......................... 285/80; 73/37, 40.7, 86.583
See application file for complete search history.

(56) References Cited

U.S. PATENT DOCUMENTS

| 1,579,954 | A | * | 4/1926 | Sauton | G01F 15/14 285/30 |
|---|---|---|---|---|---|
| 4,407,146 | A | * | 10/1983 | Nielsen, Jr. | F16B 41/005 285/80 |
| 4,699,168 | A | * | 10/1987 | Hauffe | F16K 35/06 137/385 |
| 4,993,260 | A | * | 2/1991 | Bednarz | E03B 7/072 285/32 |
| 6,606,887 | B1 | * | 8/2003 | Zimmer | E05B 73/0082 70/14 |
| 7,628,428 | B2 | * | 12/2009 | Rampton | F16L 58/02 285/45 |

(Continued)

*Primary Examiner* — Aaron M Dunwoody
(74) *Attorney, Agent, or Firm* — Ewing & Jones, PLLC; Ira Domnitz

(57) ABSTRACT

In various embodiments, the present invention describes a system that attaches to an existing pipeline, pipe, valve or meter in order to prevent unwanted theft and tampering with fluids and gasses flowing through the pipeline, pipe, valve or meter. In one embodiment of the present invention, the inventive device has two locking halves that mechanically and releasably interact with each other and cover the metering device prior to being locked. In one embodiment of the present invention one housing frame connect with a rectangular base underneath the invention thereby allowing it to lock the meter. In one embodiment of the present invention the electronic signal devices are elevated from the meter thereby preventing accidental dislodging and tampering.

2 Claims, 4 Drawing Sheets

(56) References Cited

U.S. PATENT DOCUMENTS

| | | | |
|---|---|---|---|
| 8,955,540 B2* | 2/2015 | Agbay | F16K 35/06 137/382 |
| 2003/0127849 A1* | 7/2003 | Workman | F16L 19/005 285/80 |
| 2010/0319416 A1* | 12/2010 | Eller, Jr. | F16K 35/06 70/164 |

* cited by examiner

METER LOCK AND EXTENDER SYSTEM AND METHOD USE

CROSS-REFERENCE TO RELATED APPLICATIONS

This application claims priority to U.S. provisional patent application 61/702,409, filed Sep. 18, 2012, and to U.S. provisional patent application 61/775,074 filed Mar. 8, 2013, which are incorporated by reference herein in their entirety.

STATEMENT REGARDING FEDERALLY SPONSORED RESEARCH

Not applicable

BACKGROUND

The present invention, and inventive system, is a new and novel locking and protection mechanism for pipes and pipelines, that prevents unauthorized access to metering valves and damage to valve sensing equipment. The present invention can protect, but is not limited to, water meter, oil and gas valves. In one embodiment of the present invention, the present invention is installed and works in conjunction with the existing pipelines, including, but not limited to, water, oil, and gas pipelines to prevent tampering with the meters attached to such valves and pipelines and thereby preventing theft of the fluids, or gasses, running through those pipelines, pipes or valves. In one embodiment of the present invention, by inserting the locking unit onto a valve meter assembly, such as a water pipe, the fluid flow may be regulated or controlled to an existing business, residence, or shop, by preventing the tampering with the fluid meter and/or the spud nut, or the equipment monitoring these devices. In one embodiment of the present invention the present inventive device can secure the actual spud nut of the pipeline valve, as opposed to other embodiments of the present invention in which the meter valve itself is secured.

In one embodiment of the present invention contains a new and novel extension for a transponder for a meter, or any device that uses a transponder, that needs to be extended. The transponder could be used separately from the locking device, or as a unit, just as the locking device can be used separate from the transponder extender. In the past, transponders have been known to detach from devices, such as water meters, either from fluid material flow detaching them, through fluid movement, or due to flimsy construction elements that cause the transponders to detach by being struck by a physical object, as in when a worker is doing work near the transponder and knocks the transponder off the meter. Transponders that are compromised cannot transmit signals thereby causing a disruption in services for the pipelines, pipes and valves as well as the fluid, or gas, flowing through them. If the transmitter is not signaling then it is possible that the pipeline is being tampered with and/or the lock system has been compromised.

In several embodiments of the present invention, the present inventive system allows a user to control the monitoring of fluids, and gases, which through the pipelines, pipes and/or valves and will decrease theft of said fluids, or gasses, as well as increase the security and accuracy of data transmitted by protecting the transmitting equipment, valves, or meters themselves.

SUMMARY

In various embodiments, the present invention describes a system that attaches to an existing pipeline, pipeline meter, and or pipeline valve, to secure the metering valve attached to the pipeline and prevent tampering with the meter, pipeline or pipeline valve. In other embodiments pipeline security is enhanced because the meter transponder associated with the pipeline, or pipe, is elevated and therefore not as prone to accidental dislodging. In several embodiments of the present invention, the meter valve can be for a water meter, or other fluid or gas flow meter. In several embodiments of the present invention, the inventive system is designed to prevent unauthorized tampering with pipelines, such as water, oil, or gas lines, by providing a covered lock on the actual metering device associated with said pipelines, and/or preventing the transponder associated with the pipeline from being accidentally removed. In one embodiment of the present invention, the inventive device has two locking covers, and base, that mechanically and releasably interact with each other and cover the metering device prior to being locked. In one embodiment of the present invention the locking device connects with a base underneath the item to be locked and a top unit thereby allowing it to lock the meter, or pipeline.

In one embodiment of the present invention, the present inventive locking device is placed on the existing pipeline, and can directly secure the spud nut of the pipeline therein. In this embodiment of the present invention, the inventive device has upper and lower portion locking halves that mechanically and releasably interact with each other and cover spud nut prior to being locked. In one embodiment of the present invention two halves of the locking device connected with a rectangular base underneath the invention thereby allowing it to lock the spud nut.

In several embodiments of the present invention, the present invention is also designed to extend the meter transponder away from the metering device, such as in the case of a water meter, thereby preventing the fluid flow from dislodging the transponder off the meter and stopping the transmission of signals from the transponder. In several embodiments, the present invention also allows for increased visibility so workers working near the meter can see the transponder easier and therefor and not accidentally physically strike and dislodge the transponder off of the meter. It is envisioned that the present invention can be used on any device that needs a transponder to be elevated, or any electrical device needing to transmit signals. In several embodiments of the present invention, the present invention can comprise at least two extension pieces that can adjust relative to each other and raise the transponder so that it can transmit a signal past the water meter box.

By preventing access to the meter valve, spud nut, and/or preventing the accidental dislodging of a transponder associated with pipeline, the owner and/or regulator of the pipeline has better control over their respective fluid enforcement. The embodiments of the present invention offer interchangeable bases, extensions and security straps depending on the size of meter, transponder, pipeline, or spud nut to be protected.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
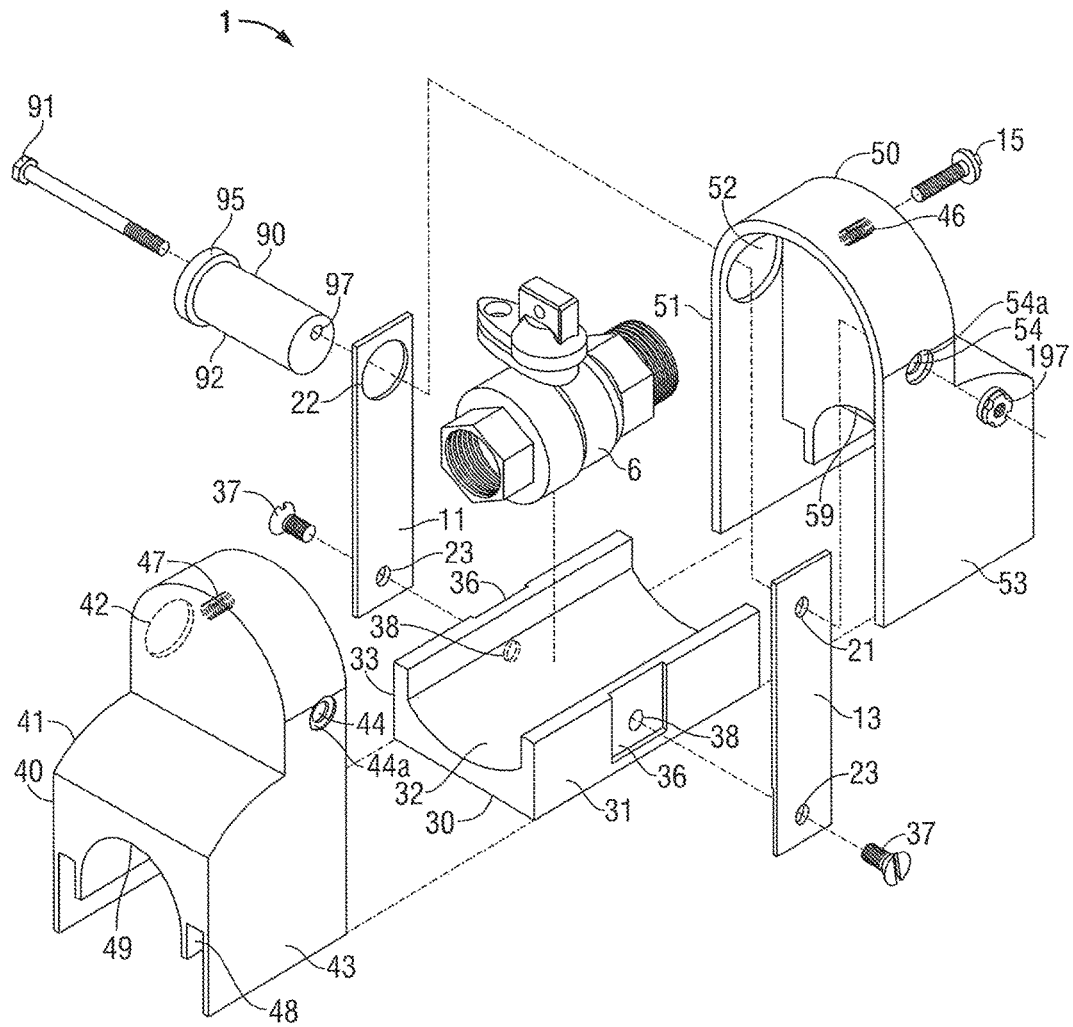
FIG. 1 illustrates an exploded view of one embodiment of the locking mechanism of the present invention with a male and female housing.

In the following description, certain details are set forth such as specific quantities, sizes, etc. . . . so as to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

Referring to the drawings in general, it will be understood that the illustrations are for the purpose of describing particular embodiments of the disclosure and are not intended to be limiting thereto. Drawings are not necessarily to scale.

While most of the terms used herein will be recognizable to those of ordinary skill in the art, it should be understood, however, that when not explicitly defined, terms should be interpreted as adopting a meaning presently accepted by those of ordinary skill in the art. In cases where the construction of a term would render it meaningless or essentially meaningless, the definition should be taken from Webster's Dictionary, 11th Edition, 2008. Definitions and/or interpretations should not be incorporated from other patent applications, patents, or publications, related or not, unless specifically stated in this specification or if the incorporation is necessary for maintaining validity. "Pipeline" or "pipe" as defined herein is to include any tubular through which a fluid or gas will, can, or does flow. "Valve" as defined herein is to include any junction point on a pipeline or pipe. "Meter" as defined herein is to include any device use, and attached to a pipeline, pipe, or valve that is designed to measure variables in the pipeline or pipe, including, but not limited to speed, pressure, flow, and/or volume. "Spud nut" as defined herein is to include the connective device that connects the meter to the pipeline or pipe. "Flat bottom" as defined herein may include a plurality of shapes that do not have a flat bottom, but rather any three dimensional geometric shape suitable for forming a bottom of a locking device.

One or more illustrative embodiments incorporating the invention disclosed herein are presented below. Applicants have created a revolutionary, and novel security system, and meter extender, for pipelines, pipes, valves, as well as tubulars.

As shown in FIG. 1, in one embodiment of the present invention the inventive lock system 1 may be constructed with a female housing unit 40, a male housing unit 50, and a flat bottom 30. Also illustrated is the meter valve 6, in this illustration a water meter valve as is commonly used in the industry to attach to a pipeline 3, although it is envisioned that the present locking system 1, could be used on a plurality of different pipelines that utilize meter valves 6 similar in construction to a water meter valve. The present locking system 1 is also preferably designed to fit around a plurality of pipelines 3 and can be sized and constructed accordingly. As illustrated the female housing unit 40, a male housing unit 50, and a flat bottom 30 may be constructed of materials such as metals, iron, hard plastics or other materials that would provide a suitable locking material for a pipeline 3. The female housing unit 40, a male housing unit 50, and a flat bottom 30 may also all be constructed of different materials than each other.

Figure 3:
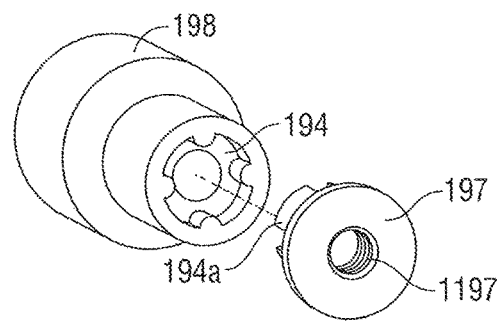
FIG. 3 illustrates one embodiment of the locking tool for several embodiments of the present invention.

In one embodiment of the present invention, the female housing unit 40 is preferably constructed to be of a solid three dimensional shape with a partially hollowed interior. The female housing unit 40 may be constructed of any geometric shape provided that the disclosed features present in this application are included and met. In one embodiment of the present invention, female housing unit 40 is preferably constructed to have two orifices 42 and 44 respectively on side walls 41 and 43. Orifice 42, on side wall 41, is preferable constructed to be larger in diameter than orifice 44 and designed to have a security member 90, pass through it when the present inventive device is assembled. In one embodiment of the present invention there is a threaded receiving orifice 47 which is near the top of the female housing unit 40, is internal to female housing unit 40, does not pass through to the exterior of 40, and is coincides to the corresponding orifice 46 on male housing unit 50, such that when assembled the threaded screw 15 can mechanically engage both orifices 46 and 47 and pass through them therein securing the female housing unit 40 and the male housing unit 50 together. In several embodiments of the present invention screw 15 has a proprietary head which is substantially shaped in a similar face pattern as to the female engagement face 194 of the locking nut 197. (FIG. 3). Screw 15 adds a second level of security for this embodiment of the locking system 1.

Figure 6:
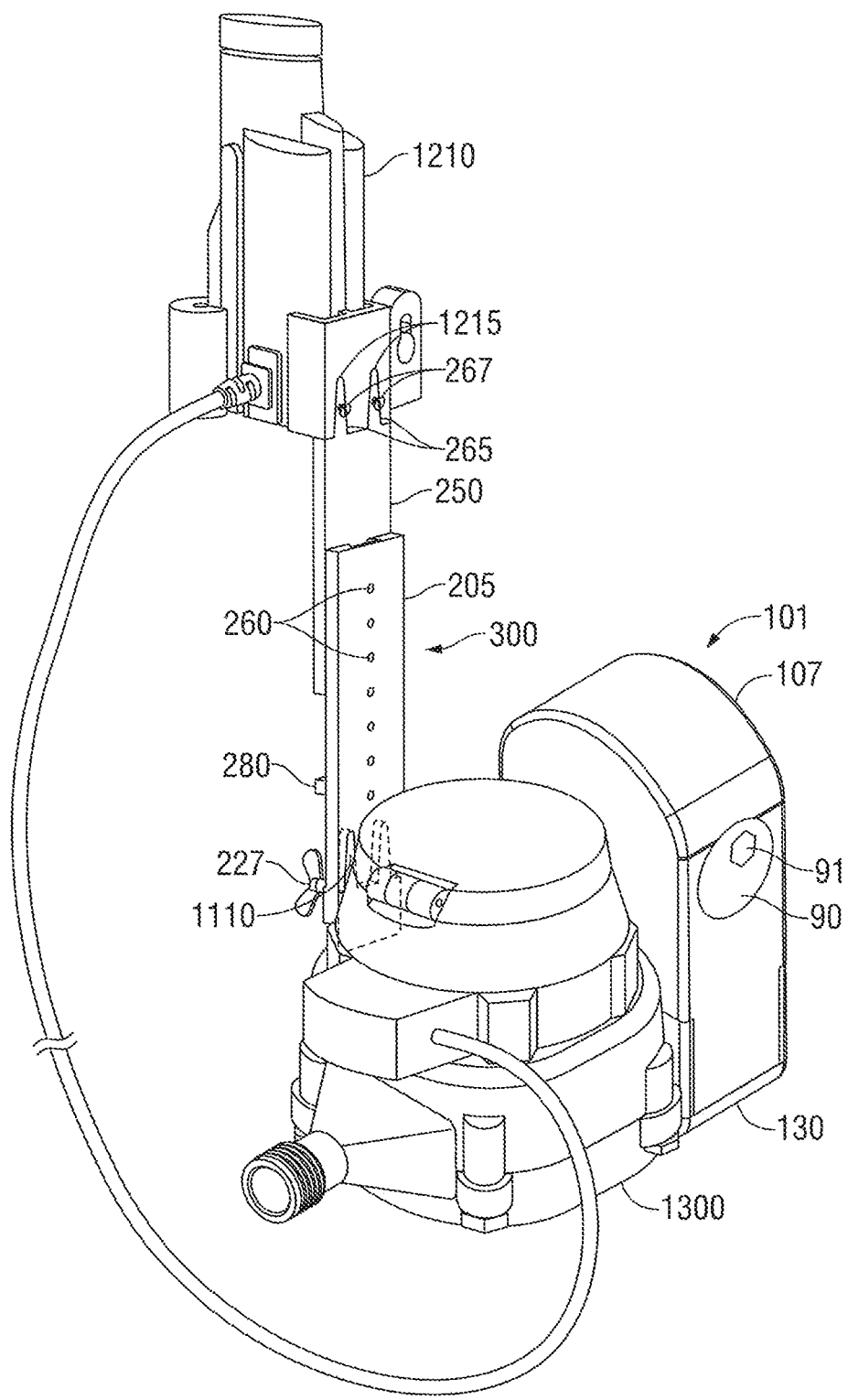
FIG. 6 illustrates an assembled view of one embodiment of the locking system on the spud nut and the extender on a meter.

As illustrated, in several preferred embodiments of the present invention, the bottom side of the female housing unit 40 is machined with two slit housings 48 that are, in some embodiments, machined and designed slide over the flat bottom 30 when the present lock system 1 is assembled. Also illustrated on the lower area of female housing unit 40 is the meter valve interface 49 which is preferable machined to fit snuggly over the meter valve 6 when the device is assembled (FIG. 6). Valve interface 49 is preferably designed to accommodate any size standard meter valve 6. Female housing unit 40 is also preferably designed to have side walls 41 and 43 which will encompass the security straps 13 and 11 when the unit is lock system 1 is assembled.

In one embodiment of the present invention, the male housing unit 50 is preferably constructed to be of a solid three dimensional shape with a hollow interior and have two orifices 52 and 54 respectively on side walls 51 and 53. Orifice 52, on side wall 51, is preferable constructed to be larger than orifice 54 and designed to have a security member 90, pass through it when the present inventive device is assembled. In one embodiment of the present invention there is a threaded receiving orifice 46 which is near the top of the male housing unit 50 and is perpendicular to the corresponding orifice 47 on female housing unit 40, such that when assembled the screw 15 can mechanically engage both orifices 46 and 47 and pass through them therein securing the female housing unit 40 and the male housing unit 50 together as a second added security feature for this embodiment. As illustrated, in several preferred embodiments of the present invention, the male housing unit 50 is machined specifically, to mechanically slide over the female housing unit 40, when engaged, and also slide over the flat bottom 30 when the present locking device is assembled. Ergo, male housing unit 50 and female housing unit 40 need to be machined to be compatible. Also illustrated on the lower area of male housing unit 50 is the meter valve interface 59 which is preferable machined to fit snuggly over the meter valve 6 when the device is assembled. Valve interface 59 is preferably designed to accommodate any size standard valve 6. Male housing unit 50 is also preferably designed to have side walls 51 and 53 which will encompass the female housing unit 40 when the unit is lock system 1 is assembled.

In one embodiment of the present invention, the flat bottom 30 is preferably constructed to be of a solid three dimensional shape and have two orifices 38 respectively on side walls 31 and 33. Flat bottom 30 is also preferably constructed to have a concave face 32 which will face and engage the meter 6, when the device is assembled. The flat bottom base 30, can have a flat bottom or a bottom of any other three dimensional geometric configuration. In one preferred embodiment the side walls 31 and 33 rise higher than the concave face 32. The two side walls 31 and 33 are preferably machined to have square faces 36 cut out of their surfaces opposite the interior of the concave face 32. In several embodiments of the present invention, the square faces 36 are machined to have two orifices 38 which enter into the flat bottom 30, but do not traverse through the flat bottom 30 or perforate the concave face 32.

In one embodiment of the present invention, the flat bottom 30 is mechanically attached to two security straps 13 and 11. Security straps 13 and 11 may be constructed of materials such as metals, iron, hard plastics or other materials that would provide a suitable locking material for a pipeline 3. Located distal to each other on security strap 13 are orifices 21 and 23. Located distal to each other on security strap 11 are orifices 22 and 23. Orifices 22, 42 and 52 are preferably constructed so as to be of the same or similar diameter when the present lock system 1 is engaged wherein the Orifices 22, 42 and 52, are aligned to as to allow for the locking security member 90 to mechanically be passed through them and secured.

In one embodiment of the present invention, the security member 90 comprises a threaded locking screw 91 and a housing insert 92. The locking screw 91 is preferably machined to be constructed with a flat surface. In several embodiments of the present invention, the housing insert 92 is preferably constructed with a head 95 that is larger in diameter than the housing insert 92 itself and the orifice 52 as well. Housing insert 92 is preferably constructed with and an orifice 97 through which the locking screw 91 may pass. In assembly of the security member 90, the locking screw 91 is inserted into the housing insert 92 via the orifice 97 locking screw 91 engaging the head 95, which is preferably constructed with a standard head engagement indention 98 (FIG. 2) such that the locking screw 91 is flush with the engaging head 95. The security member 90 is then placed in to the orifices 52 and 54 such that the locking screw 91 will pass through orifice 54. [FIG. 1]. The locking screw 91 can then be tightened by the locking nut 197 (FIG. 3). In several embodiments of the present invention the order of assembly for the security member 90 may be rearranged.

One embodiment of the present invention, the present invention is assembled in the following manner, the flat bottom 30 is mechanically attached to two security straps 11 and 13 by screwing in screws 37 into orifices 23 found on security straps 11 and 13. This assembly is then placed under meter valve 6. After this step, the female housing unit 40 is then place onto the flat bottom 30 and slid over the security straps 11 and 13, such that the security strap 11 is covered by the side wall 41 and the security strap 13 is covered by the side wall 43. The female housing unit is then slid over water meter valve 6. At this point the orifices 44 and 22 are preferably aligned with each other. The next step in assembly is to slide the male housing unit 50 over the female housing unit 40 and lining up the orifices 54 and 44 such that they are aligned and the meter valve 6 reverse half is covered by the male housing unit 50. Orifice 54 may have a recessed ledge 54*a*, in order that the locking nut 197 is flush with the male housing 50. In some embodiments female housing 40 may have a recessed ledge 44*a* on orifice 44 that allows for the locking nut 197 to flush with the female housing 40. In some embodiments of the present invention the orifices 44 and 54 are designed to have a wide enough diameter such that the locking nut 197 is adjacent and touching the securing strap 13. At this point, the security member 90 is placed through the orifice 52 and 42 and locking screw 91 is placed through the head 95 and of the housing insert 92. The locking screw 91 is then moved into the housing insert 92 and screwed into the locking nut 197 vie tightening the locking nut 197 with the unlocking tool 198. As an option, and as illustrated, the final locking screw 15 can then be screwed into the orifice and 46 and 47 there in locking the lock system 1 together. In several embodiments of the present invention, final locking screw 15 has a proprietary locking nut 197 *a* similar in design and shape to 197.

Figure 2:
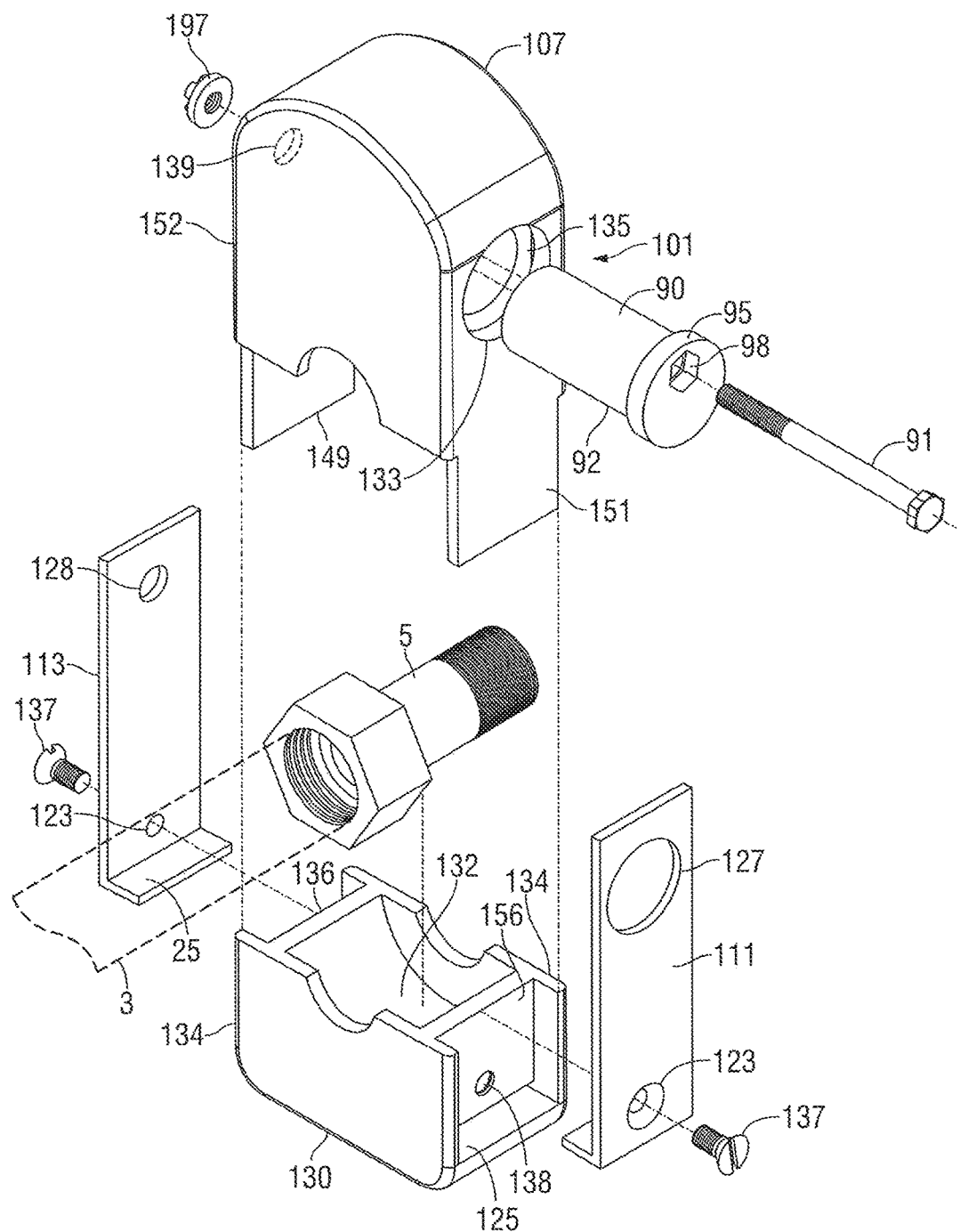
FIG. 2 illustrates an exploded view of one embodiment of the locking mechanism of the present invention with a spud nut lock.

As shown in FIG. 2, in one embodiment of the present invention the inventive lock system 1 may be used without a both a female housing unit 40 and a male housing unit 50. In this embodiment of the present invention, flat bottom, hollow housing unit 107, and security straps 113 and 111 may be constructed of materials such as metals, iron, hard plastics or other materials that would provide a suitable locking material for a pipeline 3. In this embodiment of the present invention the flat bottom 130, is modified to be shorter than the flat bottom 30. In one embodiment of the present invention, the flat bottom 130 is preferably constructed to be of a solid three dimensional shape and have two orifices 138 respectively on side walls 134. Flat bottom 130 is also preferably constructed to have a concave face 132 facing opposite the flat bottom surface. The flat bottom base 130, can have a flat bottom or a bottom of any other three dimensional geometric configuration. In one embodiment the side walls 134 are the same level as concave face 132. The two side walls 134 are preferably machined to have square faces 136 cut out of their surfaces opposite the interior of the concave face 132. In several embodiments of the present invention, the square faces 136 are machined to have two orifices 138 which enter into the flat bottom 130, but do not traverse through the flat bottom 130 or perforate the concave face 132. In this embodiment, the locking system 101 is also preferably designed to fit around a plurality of pipelines 3 and can be sized accordingly. As further illustrated, in this embodiment of the present invention, the flat bottom 130 will engage the spud nut 5 of the meter valve 6 when then locking system 101 is engaged. As further illustrated, in some embodiments of the present invention there is a shelf 125 machined onto the flat bottom 130 and adjacent to the square face 136.

In one embodiment of the present invention, the hollow housing unit 107 is preferably constructed to be of a solid three dimensional shape and have two orifices 139 and 135 respectively on side walls 152 and 151. Hollow housing unit 107, orifice 135, on side wall 151, is preferable constructed to be larger than orifice 139. Also illustrated on the lower area of housing unit 107 is that meter valve interface 149 which is preferable machined to fit snuggly over the spud nut 5 of the meter valve 6 when the device is assembled. Valve interface 149 is preferably designed to accommodate any size standard valve. As illustrated the housing unit 107 may be constructed of materials such as metals, iron, hard plastics or other materials that would provide a suitable locking material for a pipe line. Housing unit 107 is also preferably designed to have side walls 151 and 152 which will encompass the security straps 111 and 113 when the unit is locking system 101 is assembled.

In one embodiment of the present invention, the flat bottom 130 is mechanically attached to two security straps 111 and 113. Security straps 113 may be constructed of materials such as metals, iron, hard plastics or other materials that would provide a suitable locking material for a pipe line 3. As illustrated, in some embodiments of the present invention, the security straps 111 and 113 may be designed with bases 25 which may be positioned facing the flat bottom 130 when the locking system 101 is assembled. When assembled, the bases 25 rest on the shelves 125. Located distal to each other on security straps 113 are orifice 123 and 128. Located distal to each other on security strap 111 are orifice 123 and 127. Orifice 127 is preferably constructed to be of the same or similar diameter to orifice 135.

As illustrated in FIG. 2, in one embodiment of the present invention, the security member 90 comprises a locking screw 91 and a housing insert 92 with a head 95. The head 95 is preferable constructed to be able to mechanical fit snuggly with the orifice 135 such that the head 95 will be in contact with, adjacent to, and rest on the ledge 133 of the orifice 135. This will prevent in any embodiment the security member 90 from falling into the body of the lock system 1 or being dislodged.

One embodiment of the present invention, is assembled in the following manner, the flat bottom 130 is mechanically attached to two security straps 111 and 113 by placing the bases 25 on to the respective shelves 125. At this point, the security straps 111 and 113 are mechanically attached to the flat bottom 130 by screwing in screws 137 into orifices 123. This assembly is then placed under the spud nut 5 of meter valve 6. After this step, the housing unit 107 is then place onto the flat bottom 130 and slid over the security straps 111 and 113, such that the security strap 113 is covered by the side walls and security strap 111 is covered by side wall 152 and the spud nut 5 is covered by the housing unit 107. At this point the orifices 135 and 127 are preferably aligned with each other. The security member 90 is then placed through the orifice 135 and 127 with housing insert 92 and threaded end of the locking screw 91 moving through orifice 39. The locking screw 91 is then moved into the housing insert 92 and screwed into the locking nut 197 vie tightening the locking nut 197 with the unlocking tool 198 (FIG. 3).

Shown in FIG. 3, is one embodiment of the unlocking tool 198 used in several embodiments of the present invention. As illustrated, the unlocking tool 198 has a female engagement face 194. Female engagement face 194 is preferably designed with a proprietary shape, as illustrated a rounded cross, but any proprietary three dimensional shape. The engagement face 194 is preferably designed to engage with the corresponding male face 194a that is raised from the locking nut 197. Locking nut 197 is preferably designed to have internal threads 1197 to engage the locking screw 91 then the present inventive device is assembled. Both female engagement face 194 and male engagement face 194a are preferably designed to matingly engage such that when in use the locking nut 197 can be rotated to either tighten to the locking screw 91 to the locking nut 197 or loosen it from the locking nut 197. In many embodiments the female engagement face 194 may be switched with the male engagement face 194a such that the female engagement face is located on the unlocking tool 198 and the male engagement face is located on the locking nut 197. The unlocking tool 198 maybe designed to standardly engage a socket wrench, and or torque wrench on the non-locking nut 197 engagement side.

Figure 4:
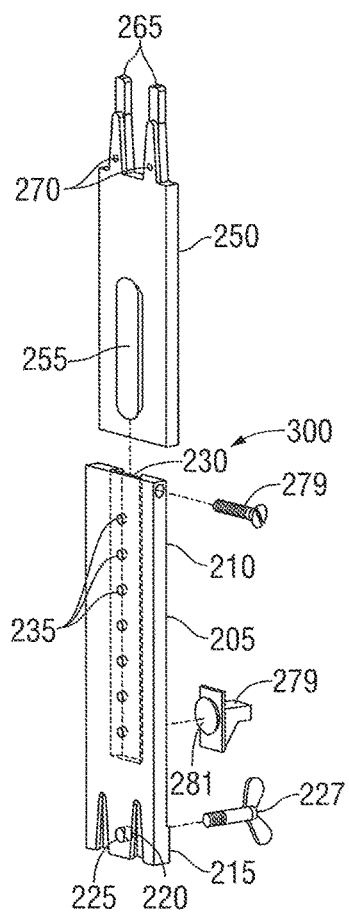
FIG. 4 illustrates an exploded view of the dove tail embodiment of the extender of the present invention.

As shown in FIG. 4, is one embodiment of extender of the present invention and lock security system. FIG. 4 illustrates one embodiment of the base plate 205 of the extender 300 of the present invention, however the extender 300 can be used with any device that attached to a meter 1300 in a similar fashion to a transponder. In many embodiments of the present invention, base plate 205 may be composed of hard plastic, metal or other materials suitable for use in creating a solid, wear resistant extender 300. As illustrated, base plate 205 is preferably composed to have an upper end 210 and a lower end 215. The upper end 210 is distinguished from the lower end 215 by being of a smaller width than the lower end 215. Base plate 205 is preferably rectangular in construction, however, other geometric shapes can be utilized. As illustrated, on the lower end 215, there is an extension 220 that comes out of the body of the base plate 205. The extension 220 is preferably hollow with an orifice 225 that runs through the body core of the base plate 205. In some embodiments of the present invention, as illustrated, it is preferably that orifice 225 is machined to allow for screw 227 to mechanically be inserted in to the orifice 225 thereby giving the extender 300 more rigidity while in use, however not all embodiments require the use of screw 227. In some embodiments of the present invention, it is preferably that orifice 278 is machined to allow for screw 279 to mechanically be inserted in to the orifice 228 thereby giving the extender 300 more rigidity while in use, however not all embodiments require the use of screw 279. Also, illustrated in this embodiment is the moving plate toggle 280, which can be inserted below the moving plate 250 on the recessed area 230. Toggle 280 is preferably constructed with an oval shaped head 281, as illustrated, and dovetails into the track so that it may slide into the dovetail track of recessed area 230 (as illustrated). Head 281 can be of any geometric shape that can fit and rotate in the recessed area 230. In one embodiment of the present invention, head 281 is preferably designed to be rotated 90 degrees when in use such that it wedged in to the dove tail track of recessed area 230 thereby keeping the upper end 210 from moving towards the base plate 205.

In some embodiments of the present invention, the upper end 210 is preferably constructed to have a recessed area 230 that forms a dove tailed track on the upper end 210. The recessed area, or track, 230 may be constructed to have multiple orifices 235 that bore through the width of the upper end 210, this is not a necessary feature of several embodiments of the present invention though. In some embodiments of the, present invention, orifices 235 are preferably constructed to allow for screws 260 to be mechanically inserted into the orifices 235 thereby allowing the moving plate 250 to be adjusted relative to the base plate 205.

On the back side of the base plate 205 on the lower end 215 there are receiving ends 200. Receiving ends 200 are preferably designed as hollowed out receptors for receiving the feet or protrusions 1100 that extend from the meter 1300. See FIG. 5.

FIG. 4 illustrates one embodiment of the present invention, moving plate 250 may be composed of hard plastic, metal or other materials suitable for use in creating a solid, wear resistant base. Moving plate 250 is preferably constructed to have a general rectangular shape with two prongs 265 on the top portion. The two prongs 265 are preferably constructed to have orifices 270 which bore through the width of the moving plate 250. The prongs 265 are preferably constructed to engage the back sleeves 1215 of a transponder 1210, or other similar electrical device. See FIG. 6. It is envisioned that screws, or tap in screws 267, can be placed into the orifices 270 when the extender is attached to the transponder 1210 thereby increasing the stability of the prongs 265 in the back sleeves. FIG. 6.

Figure 5:
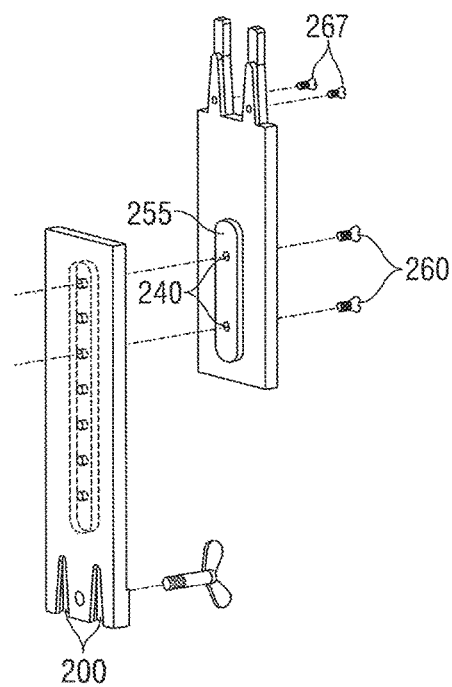
FIG. 5 illustrates an exploded view of the ovoid slot and track embodiment of the extender of the present invention.

FIG. 5 shows one embodiment of the present invention in exploded view with the ovoid and track configuration. In some embodiments of the present invention, such as showing in FIG. 5, moving plate 250 is preferably constructed to have a raised area 255 on the lower side. The raised area 255 is preferably designed to be ovoid in shape and to fit snuggly into the recessed area 230, in this embodiment, not dove tailed, of the base plate 205. The raised area 255 is preferably designed to have orifices 240 that bore completely through the moving plate 250. The orifices 240 are preferably designed to mechanically engage screws 260 in order to engage the base plate 205 when assembled.

FIG. 6 shows one embodiment of the present invention, as a group system, as it can be attached to a meter 1300, in this case, a water meter. It should be noted that in many embodiments of the present invention, that the present invention can be utilized on any mechanical device that needs to have a transponder, or other electrical device elevated. Meter 1300, is of the design typically used in the industry with protrusions 1100 that are usually designed to engage a transponder 1210 in the sleeves 1215. As shown in FIG. 6, the extender 300 is lowered on to the protrusions 1100 so that the protrusions 1100 insert into the receiving ends 200. The height of the extender 300 can be modified be removing the screws 260 and raising or lowering the moving plate 250 relative to the base plate 205 while still in the recessed area 230. When the desired height is reached, the screws 260 can be put back in and aligned with the proper orifices in the recessed area 230. The transponder 1210 is then lowered on the prongs 265 so that the prongs engage the sleeves 1215. Optionally, screws can be put through the orifice 270 of the extender 300 in order to press against the inner body of the sleeves 1215 thereby increasing the tight fit of the prongs 265 in sleeve 1215.

As also illustrated in FIG. 6 in assembled form, the flat bottom 130 is mechanically attached to two security straps 111 and 113 by placing the bases 25 on to the respective shelves 125. At this point, the security straps 111 and 113 are mechanically attached to the flat bottom 130 by screwing in screws 137 into orifices 123. This assembly is then placed under the spud nut 5 of meter valve 6. After this step, the housing unit 107 is then place onto the flat bottom 130 and slid over the security straps 111 and 113, such that the security strap 113 is covered by the side walls and security strap 111 is covered by side wall 152 and the spud nut 5 is covered by the housing unit 107. At this point the orifices 135 and 127 are preferably aligned with each other. The security member 90 is then placed through the orifice 135 and 127 with housing insert 92 and threaded end of the locking screw 91 moving through orifice 39. The locking screw 91 is then moved into the housing insert 92 and screwed into the locking nut 197 via tightening the locking nut 197 with the unlocking tool 198 (FIG. 3). As shown this assembled lock system 101 and extender 300 are locked down on a spud nut 5 and meter 1300.

As also illustrated in FIG. 6 in assembled form, the present invention operates, once installed by preventing a user from accessing the spud nut 5 (or meter valve 6 in other embodiments such as in FIG. 1) and tampering with the fluid, or gas flowing though the spud nut 5 or meter valve 6 without first disassembling the locking system 1 or 101. Also illustrated is the extender 300 which elevates the transponder 1210, or other electrical device away from the meter 1300 and makes it more visible and less prone to being knocked off the meter 1300.

Although several preferred embodiments of the present invention have been described in detail herein, the invention is not limited hereto. It will be appreciated by those having ordinary skill in the art that various modifications can be made without materially departing from the novel and advantageous teachings of the invention. Accordingly, the embodiments disclosed herein are by way of example. It is to be understood that the scope of the invention is not to be limited thereby.

I claim:

1. An improved pipe security locking system comprising;
   a pipe;
   a bottom base plate;
      said bottom base plate further comprising;
         an underside;
         a concave upper portion; and
         two solid sides which are machined to form two substantially square indentions with threaded orifices in said square indentions;
   a housing unit;
      said housing unit further comprising;
      one large diameter housing orifice and one of small diameter housing orifice;
   two securing straps:
      said two securing straps further comprising;
      two sets of top securing strap orifices and two sets of bottom securing strap orifices;
         said two sets of top securing strap orifices further comprising;
            a first top securing orifice of the similar diameter as said large diameter housing orifice and a second top securing orifice of the similar diameter as said small diameter housing orifice;
   locking screw;
   locking nut;
   security member with an internal orifice running its length;
   three engaging screws; in which said bottom base is mechanically attached to said two securing straps by threading the engaging three screws into the bottom securing orifices of said bottom base plate and attaching to the threaded orifices of the square indentions of said bottom base plate;
   said housing unit is placed in mechanical communication on the top side of the pipe over said bottom base, and said secured securing straps and mechanically aligned such that the large diameter housing orifice and the large diameter securing straps orifices aligned as are the small diameter housing orifice and small diameter securing straps orifices;
   the locking screw is then inserted into said security member with an internal orifice running its length, and the locking screw and security member unit combination is then inserted through the large diameter housing orifice and the large diameter securing strap orifice;

the locking screw is aligned and inserted through the small diameter housing orifice and small diameter securing strap orifice;

and the locking screw is attached mechanically with the locking bolt.

2. An improved pipe security locking system comprising;
a bottom base plate;
   said bottom base plate further comprising;
      an underside;
      a concave upper portion;
      a first nonadjacent side which is machined to a substantially square indention with threaded orifices in said square indention; and
      a second nonadjacent side which is machined to a substantially square indention with threaded orifices in said square indention;
a housing unit with one nonadjacent side and a second nonadjacent side;
   said housing unit with two nonadjacent sides further comprising;
      one large diameter housing orifice on said one nonadjacent side and one small diameter housing orifice on said second nonadjacent side;
a first securing strap;
   said first securing strap further comprising;
      a first top securing strap orifice and a first bottom securing strap orifice;
         said first top securing strap orifices further comprising;
            a first top securing orifice of the similar diameter as said large diameter housing orifice;
            and a second top securing orifice of the similar diameter as said small diameter housing orifice;
a second securing strap;
   said second securing strap further comprising;
      a second top securing strap orifice and a second bottom securing strap orifice
         said second top securing strap orifices further comprising;
            a third top securing orifice of the similar diameter as said large diameter housing orifice;
            and one a fourth top securing orifice of the similar diameter as said small diameter housing orifice;
locking screw;
locking nut;
security member with an internal orifice running its length;
three engaging screws; in which
said bottom base is mechanically attached to said first and second securing straps by threading said engaging three screws into the second and fourth securing orifices while in mechanical communication with said first and second square indentions of said bottom base plate;
said housing unit is placed in mechanical communication on the top side of said bottom base, and said first and second securing straps are mechanically aligned such that the large diameter housing orifice and the large diameter first securing straps orifices aligned as are the small diameter housing orifice of the first and second securing strap orifices;
said locking screw is then inserted into said security member with an internal orifice running its length, and said locking screw and security member unit combination is then inserted through the large diameter housing orifice and the large diameter securing strap orifice;
said locking screw is aligned and inserted through the small diameter housing orifice and small diameter securing strap orifice; and
the locking screw is attached mechanically with the locking bolt.

\* \* \* \* \*